United States Patent
Li et al.

(10) Patent No.: US 11,309,808 B1
(45) Date of Patent: Apr. 19, 2022

(54) ELECTROMAGNETIC AND TRIBOELECTRIC HYBRID ENERGY COLLECTOR FOR LOW-FREQUENCY MOVEMENT

(71) Applicant: SHANGHAI UNIVERSITY, Shanghai (CN)

(72) Inventors: Zhongjie Li, Shanghai (CN); Xuzhang Peng, Shanghai (CN); Yan Peng, Shanghai (CN); Jun Luo, Shanghai (CN); Shaorong Xie, Shanghai (CN); Huayan Pu, Shanghai (CN)

(73) Assignee: SHANGHAI UNIVERSITY, Shanghai (CN)

( * ) Notice: Subject to any disclaimer, the term of this patent is extended or adjusted under 35 U.S.C. 154(b) by 0 days.

(21) Appl. No.: 17/643,079

(22) Filed: Dec. 7, 2021

(30) Foreign Application Priority Data

Dec. 9, 2020 (CN) .......................... 202011448823.2

(51) Int. Cl.
*H02N 1/04* (2006.01)
*H02K 35/02* (2006.01)

(52) U.S. Cl.
CPC ............... *H02N 1/04* (2013.01); *H02K 35/02* (2013.01)

(58) Field of Classification Search
CPC ............ H02N 1/04; H02N 1/00; H02N 1/002; H02K 35/00; H02K 35/02; H02K 11/046;
(Continued)

(56) References Cited

U.S. PATENT DOCUMENTS

| | | | | |
|---|---|---|---|---|
| 6,983,923 B2* | 1/2006 | Fukui | .................... | F16K 31/082 335/229 |
| 7,078,832 B2* | 7/2006 | Inagaki | .................... | H02K 7/14 335/238 |

(Continued)

FOREIGN PATENT DOCUMENTS

| | | |
|---|---|---|
| CN | 107707149 A | 2/2018 |
| CN | 110557045 A | 12/2019 |

(Continued)

OTHER PUBLICATIONS

Chinese First Office Action for Chinese Application No. 202011448823. 2, The State Intellectual Property Office of People's Republic of China, Beijing, China.

(Continued)

*Primary Examiner* — Maged M Almawri
(74) *Attorney, Agent, or Firm* — M&B IP Analysts, LLC

(57) ABSTRACT

An electromagnetic and triboelectric hybrid energy collector for low-frequency movement is provided. The electromagnetic and triboelectric hybrid energy collector comprises an electromagnetic module, triboelectric modules and spring mass modules. The electromagnetic module includes a shell, a magnet frame, a magnet array, coil arrays, coil frames and coil magnetic conductive columns. The spring mass modules include respective springs, respective mass blocks and respective end caps. The triboelectric modules include multiple nano-friction power generation units which are connected in sequence. When the energy collector is excited to move a magnet assembly. The electromagnetic module generates voltage according to the Faraday's law of electromagnetic induction. The movement of the magnet assembly generated by external excitation may also cause contact and separation between triboelectric units to generate voltage.

10 Claims, 3 Drawing Sheets

(58) Field of Classification Search
CPC .... H02K 7/1869; H02K 7/1876; H02K 41/02; H02K 33/00; H02K 7/1892; H02K 33/02; H02K 33/16; H02K 33/18; H02K 5/225; H02K 5/22; H02K 5/24; H02K 3/26; H02K 3/28; H02K 3/52; H02J 1/00; B06B 1/00; B06B 1/02; B06B 1/0215; B06B 1/0223; B06B 1/0269; B06B 1/0614; B06B 1/04; B06B 1/045

USPC ......... 310/12, 4, 12.12, 12.01, 12.03, 12.13, 310/12.16, 12.26, 25, 15; 335/229

See application file for complete search history.

(56) References Cited

U.S. PATENT DOCUMENTS

| | | | | |
|---|---|---|---|---|
| 7,671,493 | B2* | 3/2010 | Takashima | G06F 3/016 310/15 |
| 7,791,456 | B2* | 9/2010 | Miura | B06B 1/045 340/407.1 |
| 8,013,480 | B2* | 9/2011 | Bang | B06B 1/045 310/12.33 |
| 8,097,991 | B2* | 1/2012 | Masami | H02K 33/16 310/15 |
| 8,188,623 | B2* | 5/2012 | Park | H02K 33/16 310/12.01 |
| 8,278,786 | B2* | 10/2012 | Woo | H02K 33/16 310/15 |
| 8,288,899 | B2* | 10/2012 | Park | H02K 33/16 310/71 |
| 8,575,794 | B2* | 11/2013 | Lee | H02K 33/18 310/15 |
| 9,461,530 | B2* | 10/2016 | Wasenczuk | B06B 1/04 |
| 9,815,085 | B2* | 11/2017 | Chun | G06F 3/016 |
| 9,906,109 | B2* | 2/2018 | Endo | H02K 33/16 |
| 2004/0119343 | A1* | 6/2004 | Ueda | B06B 1/045 310/12.31 |
| 2006/0002577 | A1* | 1/2006 | Won | H02K 33/16 381/396 |
| 2007/0085425 | A1* | 4/2007 | Hirashima | H02K 33/16 310/15 |
| 2007/0182257 | A1* | 8/2007 | Miura | H04R 11/02 310/23 |
| 2011/0018364 | A1* | 1/2011 | Kim | H02K 33/18 310/20 |
| 2011/0018365 | A1* | 1/2011 | Kim | B06B 1/045 310/20 |
| 2011/0062803 | A1* | 3/2011 | Lee | H02K 33/18 310/29 |
| 2011/0068640 | A1* | 3/2011 | Choi | H02K 5/04 310/25 |
| 2011/0089773 | A1* | 4/2011 | Choi | G06F 3/016 310/25 |
| 2011/0193426 | A1* | 8/2011 | Chung | H02K 33/16 310/25 |
| 2011/0198948 | A1* | 8/2011 | Keisuke | H02K 5/225 310/25 |
| 2011/0198949 | A1* | 8/2011 | Furuich | H02K 33/16 310/25 |
| 2011/0291497 | A1* | 12/2011 | Choi | H02K 33/18 310/25 |
| 2012/0032535 | A1* | 2/2012 | Park | H02K 35/02 310/25 |
| 2012/0073916 | A1 | 3/2012 | Chen | |
| 2012/0169148 | A1* | 7/2012 | Kim | H02K 33/16 310/25 |
| 2012/0293022 | A1* | 11/2012 | Park | B06B 1/045 310/25 |
| 2013/0033128 | A1* | 2/2013 | Yoon | B06B 1/045 310/25 |
| 2013/0033129 | A1* | 2/2013 | Hong | B06B 1/045 310/25 |
| 2013/0043766 | A1* | 2/2013 | Takahashi | H04R 17/00 310/326 |
| 2013/0099600 | A1* | 4/2013 | Park | B06B 1/045 310/15 |
| 2013/0285479 | A1* | 10/2013 | Kinoshita | H02K 35/02 310/12.12 |
| 2014/0062225 | A1* | 3/2014 | Kim | H02K 33/00 310/15 |
| 2014/0103751 | A1* | 4/2014 | Furukawa | H02K 35/02 310/25 |
| 2014/0132089 | A1* | 5/2014 | Jeon | H02K 33/16 310/14 |
| 2015/0194870 | A1* | 7/2015 | Kim | H02K 33/18 310/25 |
| 2016/0149517 | A1* | 5/2016 | Choi | H02N 1/04 427/58 |
| 2016/0149518 | A1* | 5/2016 | Wang | F03B 13/14 310/310 |
| 2016/0190903 | A1* | 6/2016 | Ohishi | H02K 35/06 310/28 |
| 2017/0033653 | A1* | 2/2017 | Wang | H02K 33/16 |
| 2017/0033673 | A1* | 2/2017 | Wang | H02K 33/16 |
| 2017/0288523 | A1* | 10/2017 | Katada | H02P 25/032 |
| 2017/0346376 | A1* | 11/2017 | Kim | H02K 15/02 |
| 2018/0026514 | A1* | 1/2018 | Mao | H02K 5/225 310/12.16 |
| 2018/0297074 | A1* | 10/2018 | Huang | B06B 1/045 |

FOREIGN PATENT DOCUMENTS

| CN | 211830613 U | 10/2020 |
|---|---|---|
| CN | 112564541 B | 9/2021 |

OTHER PUBLICATIONS

Li, Zhongjie et al. Specification of Chinese Application CN 202011448823.2, Untranslated and Translated in English. Granted: Aug. 26, 2021.

* cited by examiner

ELECTROMAGNETIC AND TRIBOELECTRIC HYBRID ENERGY COLLECTOR FOR LOW-FREQUENCY MOVEMENT

CROSS REFERENCE TO RELATED APPLICATION

This patent application claims the benefit and priority of Chinese Patent Application No. 202011448823.2, entitled "Electromagnetic and Triboelectric Hybrid Energy Collector for Low-frequency Movement" filed on Dec. 9, 2020, the disclosure of which is incorporated by reference herein in its entirety as part of the present application.

TECHNICAL FIELD

The present disclosure relates to the field of energy collection technologies, and particularly relates to an electromagnetic and triboelectric hybrid energy collector for low-frequency movement.

BACKGROUND ART

In recent years, the demands of humans for energy and energy consumption are increasing. However, traditional energy sources such as petroleum, coal and various chemical batteries have many inherent disadvantages, such as environmental pollution and limited service life. In order to remedy these drawbacks, the collection of energy, such as solar energy, wind energy and tidal energy, from the surroundings has become a leading point of research. Among these, there is significant interest in small energy conversion approaches, such as piezoelectric, electromagnetic or triboelectric energy collection approaches, which have shown excellent potential in portable electronic devices.

For sustainable energy sources, such as wind, human movement or tide and the like, are mostly low-frequency vibration, especially human movement (the frequency is usually lower than 10 Hz). And a large amount of vibration energy is stored in them for collection. However, the target working interval of most existing energy collectors is a medium-high frequency interval from tens of hertz to hundreds of hertz, and energy collection of low-frequency vibration is rarely researched. Therefore, it is urgent to design an energy collector which can obtain energy from low-frequency sustainable energy such as human movement at extremely low resonance frequency.

Nano-friction power generators have attracted attention of people under the circumstances, which is a novel energy collection and sensing technology based on Maxwell transferred charge. The nano-friction generator is low in working frequency and high in power density. However, the nano-friction generator is high in output voltage, small in output current and not easy to integrate. However, the electromagnetic energy collector is large in output current and high in output power. Therefore, a triboelectric mode and an electromagnetic mode can be matched with each other to form a hybrid energy collector. The energy collection efficiency can be improved by mixing the triboelectric mode and the electromagnetic mode, so that more mechanical energy in the system is converted into electric energy.

It can be seen that the design and development of, an electromagnetic and triboelectric hybrid energy collector is a problem that urgently needs to be solved at present.

SUMMARY

The embodiments aim to provide an electromagnetic and triboelectric hybrid energy collector for low-frequency movement to solve the problems existing in the prior art. The hybrid energy collector may combine electromagnetic energy collection and triboelectric energy collection. The low-frequency human movement may be fully utilized to collect vibration energy for generating large output power.

In order to achieve the above-mentioned purpose, the present disclosure provides the following solution.

The electromagnetic and triboelectric hybrid energy collector for low-frequency movement provided by the present disclosure includes an electromagnetic module, triboelectric modules and spring mass modules.

The electromagnetic module includes a shell, a magnet frame, a magnet array, coil arrays, coil frames and coil magnetic conductive columns. The shell includes a top cover and a bottom cover. A top of the bottom cover is covered with the top cover. The magnet frame is arranged between the top cover and the bottom cover. A top of the magnet frame and a bottom of the magnet frame are in rolling connection with the top cover and the bottom cover respectively. The magnet array is arranged in the magnet frame. The coil frames are arranged at a front end of the magnet frame and a rear end of the magnet frame respectively. A limiting part is arranged on an outer side of each of the coil frames and is clamped between the top cover and the bottom cover. Each array of the coil arrays including multiple coils are arranged in a corresponding one of the coil frames. Each of the plurality of coils is connected with the corresponding one of the coil frames through a respective one of the coil magnetic conductive columns.

The spring mass modules include respective springs, respective mass blocks and respective end caps. The end caps are arranged on two sides of the shell respectively. An inner side of each of the end caps is connected with a corresponding one of the mass blocks through a respective one of the springs. Inner sides of the mass blocks are connected with end faces of the magnet frame through the triboelectric modules respectively. The triboelectric modules include multiple nano-friction power generation units which are connected in sequence In some embodiments, the shell may be a rectangular shell.

In some embodiments, multiple guide holes may be formed in each of the top of the magnet frame and the bottom of the magnet frame. A guide ball may be installed in each of the plurality of guide holes. A guide groove may be formed in each of an inner side of the top cover and an inner side of the bottom cover. A portion, which may be protruding out of a corresponding one of the guide holes, of the guide ball may be in rolling connection with the guide groove.

In some embodiments, N poles and S poles of magnets forming the magnet array may be alternately arranged.

In some embodiments, insertion holes corresponding to the multiple coils may be formed in each of the coil frames. Each of the coil magnetic conductive columns may be inserted into a corresponding one of the insertion holes and a corresponding one of through holes of the multiple coils.

In some embodiments, a first limiting groove may be formed in an inner side of each of the end caps and a second limiting groove may be formed in an inner side. Opposite to a corresponding one of the end caps, of each of the mass blocks, the first limiting groove and the second limiting groove each may have a same diameter as a corresponding one of the springs. The first limiting groove and the second limiting groove each may have a same depth as a wire diameter of the corresponding one of the springs. Two ends of each of the springs may be arranged in the first limiting groove and the second limiting groove, respectively, and may be fixed by a corresponding one of spring baffle plates.

In some embodiments, adjacent two of the plurality of nano-friction power generation units may be connected in a V-shape.

In some embodiments, each of the plurality of nano-friction power generation units may be a substrate formed by polyimide. A non-conductive double-sided adhesive tape may be pasted on the substrate. A copper sheet served as an electrode and configured for collecting charges may be placed on the non-conductive double-sided adhesive tape. A wire may be welded on the copper sheet to extract the charges. A triboelectric material layer may be pasted on the copper sheet through a conductive double-sided adhesive tape. The triboelectric material layer may include a nylon layer and a Teflon layer which may be layered from top to bottom. A thickness of the nylon layer and a thickness of the Teflon layer may be each 50 microns. An effective area of the nylon layer and an effective area of the Teflon layer may be each 120 mm$^2$.

In some embodiments, two of the end caps may be installed at two ends of the shell through respective screws. A gasket may be further arranged between each of the two end caps and the shell.

In some embodiments, a distance between each array of the coil arrays and surfaces of the N poles and the S poles of the magnets may be 0.5 mm.

Compared with the prior art, the embodiments have the following beneficial technical effects.

Firstly, according to the electromagnetic and triboelectric hybrid energy collector for low-frequency movement, the electromagnetic module and the triboelectric modules are combined to obtain a low resonance frequency (lower than 10 Hz), so that energy can be collected at a low vibration frequency, and the purpose of collecting low-frequency human movement energy is achieved.

Secondly, according to the electromagnetic and triboelectric hybrid energy collector for low-frequency movement, an electromagnetic energy collection technology and a triboelectric energy collection technology are combined, and thus the comprehensive performance of a hybrid power system is superior to that of each independent power system.

BRIEF DESCRIPTION OF THE DRAWINGS

To more clearly illustrate the embodiment of the present disclosure or the technical solution in the prior art, the following briefly introduces the drawings to be used in the embodiment. Apparently, the drawings in the following description show merely some embodiments of the present disclosure, and those skilled in the art may still derive other drawings from these drawings without creative efforts.

Figure 1:
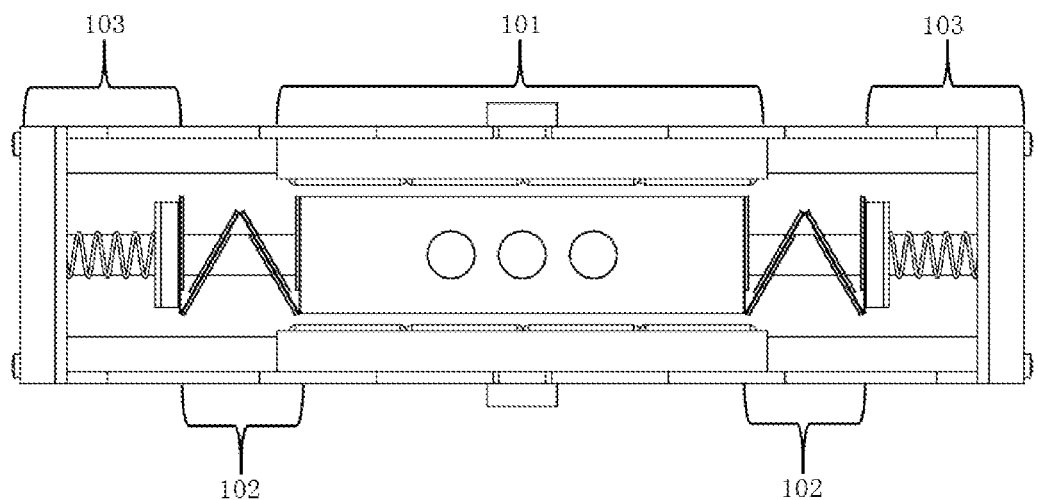
FIG. 1 is a top view after a top cover of an electromagnetic and triboelectric hybrid energy collector for low-frequency movement is hidden according to the present disclosure.

List of reference characters: 101 electromagnetic module; 102 triboelectric module; 103 spring mass module;

1 top cover; 2 guide ball; 3 coil magnetic conductive column; 4 coil array; 5 coil frame; 6 magnet frame; 7 nano-friction power generation unit; 8 mass block; 9 spring baffle plate; 10 spring; 11 gasket; 12 spring baffle plate; 13 end cap; 14 bottom cover; 15 guide ball; 16 coil magnetic conductive column; 17 coil frame; 18 coil array; 19 magnet array; 20 nano-friction power generation unit; 21 mass block; 22 spring baffle plate; 23 spring; 24 gasket; 25 spring baffle plate; and 26 end cap.

DETAILED DESCRIPTION OF THE EMBODIMENTS

The following clearly and completely describes the technical solution in the embodiments of the present disclosure with reference to the drawings in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The embodiment aims to provide an electromagnetic and triboelectric hybrid energy collector for low-frequency movement to solve the problems existing in the prior art.

To make the foregoing objective, features and advantages of the present disclosure clearer and more comprehensible, the present disclosure is further described in detail below with reference to the drawings and the specific embodiment.

Figure 2:
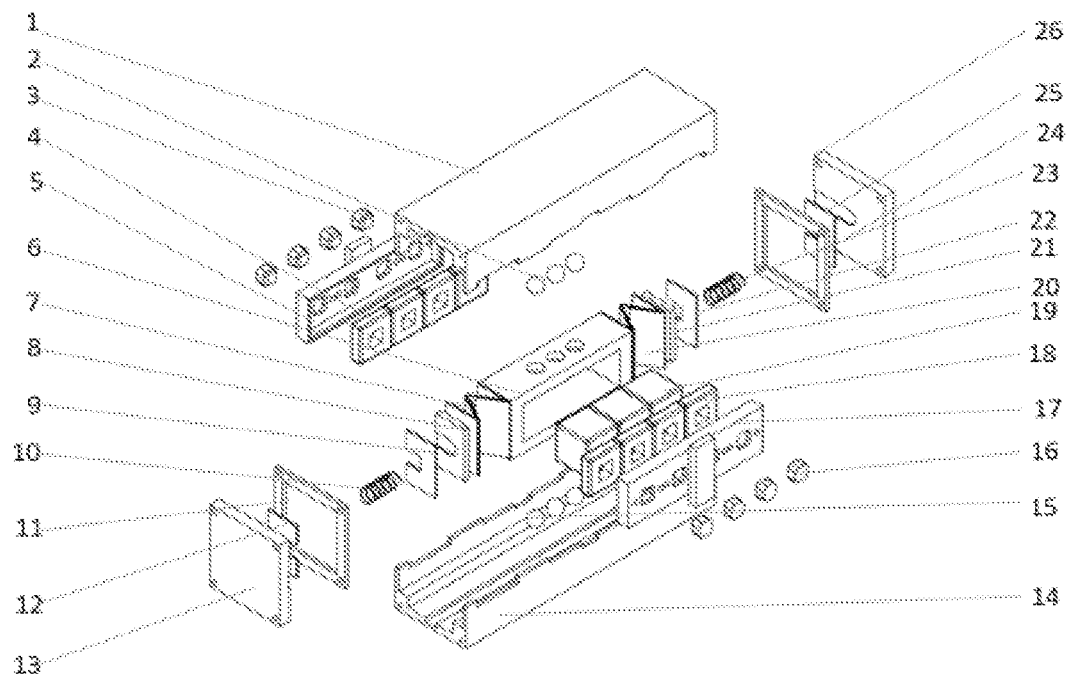
FIG. 2 is an explosive view of the electromagnetic and triboelectric hybrid energy collector for low-frequency movement according to the present disclosure.
Figure 3:
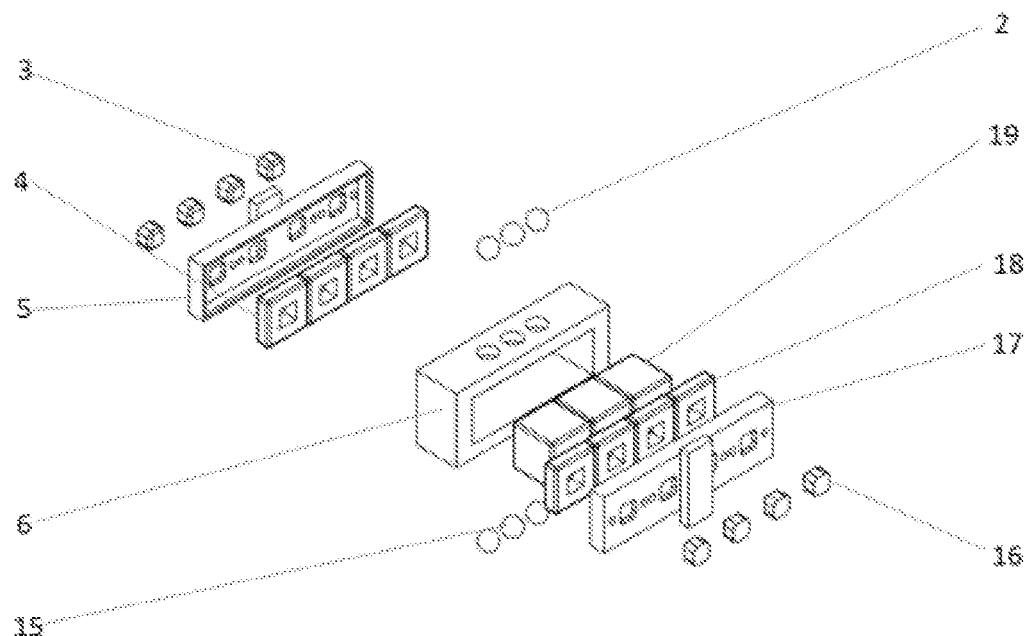
FIG. 3 is an exploded view of a electromagnetic module according to the present disclosure.
Figure 4:
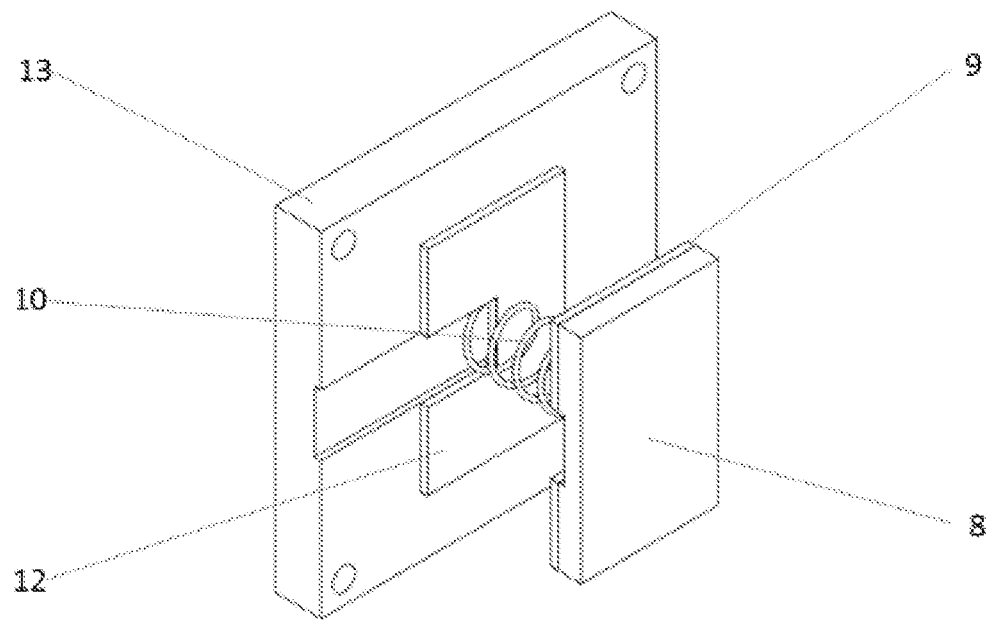
FIG. 4 is a schematic structural diagram of a single spring mass module according to the present disclosure.
Figure 5:
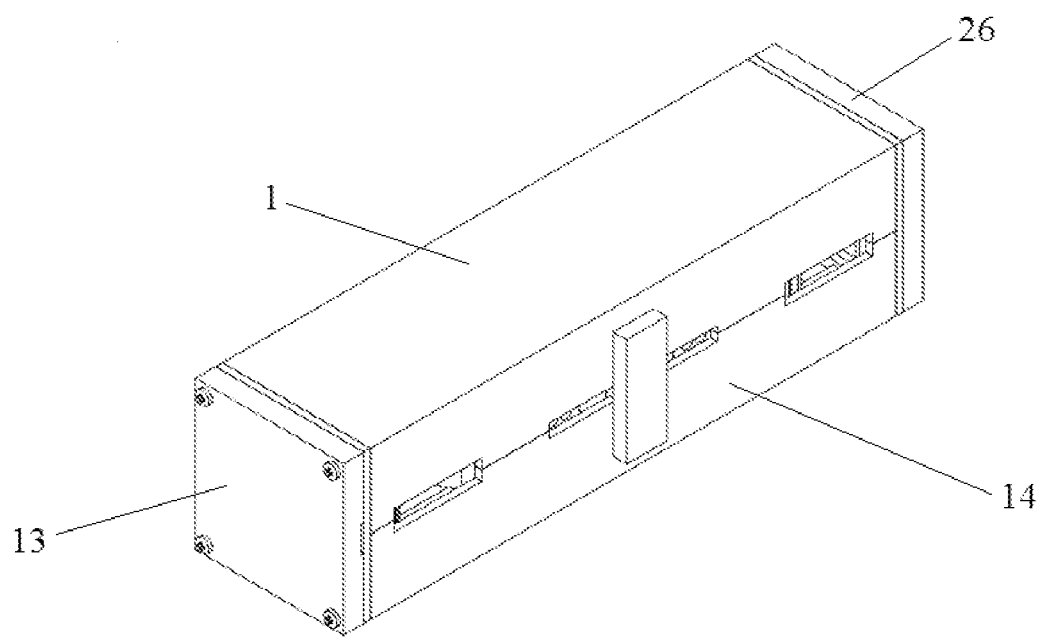
FIG. 5 is an assembly diagram of the electromagnetic and triboelectric hybrid energy collector for low-frequency movement according to the present disclosure.

The electromagnetic and triboelectric hybrid energy collector for low-frequency movement in the embodiment, as shown in FIG. 1 to FIG. 5, includes an electromagnetic module 101, triboelectric modules 102 and spring mass modules 103.

The electromagnetic module 101 includes a shell, a magnet frame 6, a magnet array 19, a coil array 4, a coil array 18, a coil frame 5, a coil frame 17, a coil magnetic conductive column 3 and a coil magnetic conductive column 16. The shell includes a top cover 1 and a bottom cover 14. A top of the bottom cover 14 is covered with the top cover 1. The magnet frame 6 is arranged between the top cover 1 and the bottom cover. A top of the magnet frame 6 and a bottom of the magnet frame 6 are in rolling connection with the top cover 1 and the bottom cover 14 respectively. The magnet array 19 is arranged in the magnet frame 6. The coil frames 17, 5 are arranged at a front end of the magnet frame 6 and a rear end of the magnet frame 6 respectively. A limiting part is arranged on an outer side of each of the coil frames 17, 5 and is clamped between the top cover 1 and the bottom cover 4. Each array of the coil arrays 18, 4 including multiple coils are arranged in a corresponding one of the coil frames 17, 5. Each of the coils of each array of the coil arrays 18, 4 is connected with the corresponding one of the coil frames 17, 5 through a respective one of the coil magnetic conductive columns 16, 3.

The spring mass modules 103 include respective springs 10, 23, respective mass blocks 8, 21, respective end caps 13, 26. The end caps 13, 26 are arranged on two sides of the shell, respectively. An inner side of each of the end caps 13, 26 is connected with a corresponding one of the mass blocks 8, 21 through a respective one of the springs 10, 23. Inner sides of the mass blocks 8, 21 are connected with end faces of two sides of the magnet frame 6 through the triboelectric modules 102, respectively. The triboelectric modules 102 include multiple nano-friction power generation units 7, 20 which are connected in sequence.

In the specific embodiment, three guide holes are formed in each of the top of the magnet frame 6 and the bottom of the magnet frame 6. A guide ball 2 is installed in each of the guide holes in the top of the magnet frame 6. A guide ball 15 is installed in each of the guide holes in the bottom of the magnet frame 6, A guide groove is formed in each of an inner side of the top cover 1 and an inner side of the bottom cover 14. A portion, which is protruding out of a corresponding one of the guide holes, of the guide balls 2, 15 are in rolling connection with the guide grooves.

In the specific embodiment, the magnet array 19 includes three magnets. N poles and S poles of the magnets in the magnet frame 6 are alternately arranged. Each of the coil frames 5, 17 are internally provided with four coils, respectively. Four insertion holes corresponding to the coils are formed in each of the coil frames 5, 17. Each of the coil magnetic conductive columns 13, 16 is inserted into a corresponding one of the insertion holes and a corresponding one of through holes of the coils, so that the connection of the coil frames and the coils is achieved.

In the specific embodiment, a first limiting groove is formed in the inner side of each of the end caps 13, 26, and a second limiting groove is formed in an inner side, opposite to a corresponding one of the end caps 13, 26, of each of the mass blocks 8, 21. The first limiting groove and the second limiting groove each have a same diameter as a corresponding one of the springs. The first limiting groove and the second limiting groove each have a same depth as a wire diameter of the corresponding one of the springs, Two ends of each of the springs 10, 23 are arranged in the first limiting groove and the second limiting groove, respectively. The two ends of the spring 10 are fixed by a corresponding one of spring baffle plates 12, 9, and the two ends of the spring 23 are fixed by a corresponding one of spring baffle plates 25, 22.

In the specific embodiment, adjacent two of the nano-friction power generation units 7 are connected in a V-shape. and adjacent two of the nano-friction power generation units 20 are also connected in a V-shape. Each of the nano-friction power generation units 7, 20 is a substrate formed by polyimide. A non-conductive double-sided adhesive tape is pasted on the substrate. A copper sheet served as an electrode and configured for collecting charges is placed on the non-conductive double-sided adhesive tape. A wire is welded on the copper sheet to extract the charges. A triboelectric material layer is pasted on the copper sheet through a conductive double-sided adhesive tape. The triboelectric material layer includes a nylon layer and a Teflon layer. The thickness of the nylon layer and the thickness of the Teflon layer are each 50 microns, and the effective area of the nylon layer and the effective area of the Teflon layer are each 120 $mm^2$.

In the specific embodiment, the end caps 13, 26 are installed at two ends of the shell through screws. A gasket 11 is further arranged between the end cap 13 and the shell, and a gasket 24 is further arranged between the end cap 26 and the shell.

In the specific embodiment, a distance between each array of the coil arrays 4, 18 and polarity surfaces (i.e., surfaces of N poles and S poles) of the magnets is 0.5 mm. The size of a single coil magnetic conductive column is 3.9 mm multiply 3.9 mm multiply 3 mm, and the single coil magnetic conductive column is made of titanium alloy. The overall dimension of the magnet frame 6 is 10 mm multiply 16 mm multiply 38 mm, the internal dimension of the magnet frame 6 is 10 mm multiply 10 mm multiply 30 mm, and the magnet frame 6 is made of titanium alloy.

The working principle of the electromagnetic and triboelectric hybrid energy collector for low-frequency movement in the present disclosure is as follows.

When the electromagnetic and triboelectric hybrid energy collector is subjected to external excitation, the magnet frame 6 drives the magnet array 19 to move in the guide grooves of the shell 1 and the shell 14 under the assistance of the guide ball arrays 2, 15, and the coil arrays 4, 18 cut magnetic induction lines to generate induced electromotive force. On the other hand, the magnet frame 6 moves along the direction of the guide groove, so that the nano-friction power generation units 7, 20 are periodically contacted and separated, so that the voltage is generated. In the excitation movement process, the spring modules play a role in limiting the movement amplitude and converting the external low-frequency vibration into the high-frequency vibration.

Several examples are used for illustration of the principles and embodiments of the present disclosure. The description of the embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. An electromagnetic and triboelectric hybrid energy collector for low-frequency movement, the energy collector comprising an electromagnetic module, triboelectric modules and spring mass modules, wherein
   the electromagnetic module comprises a shell, a magnet frame, a magnet array, coil arrays, coil frames and coil magnetic conductive columns; the shell comprises a top cover and a bottom cover, a top of the bottom cover is covered with the top cover, the magnet frame is arranged between the top cover and the bottom cover, a top of the magnet frame and a bottom of the magnet frame are in rolling connection with the top cover and the bottom cover respectively, the magnet array is arranged in the magnet frame, the coil frames are arranged at a front end of the magnet frame and a rear end of the magnet frame respectively, a limiting part is arranged on an outer side of each of the coil frames and is clamped between the top cover and the bottom cover, each array of the coil arrays comprising a plurality of coils are arranged in a corresponding one of the coil frames, and each of the plurality of coils is connected with the corresponding one of the coil frames through a respective one of the coil magnetic conductive columns;
   the spring mass modules comprises respective springs, respective mass blocks and respective end caps, the end caps are arranged on two sides of the shell respectively, an inner side of each of the end caps is connected with a corresponding one of the mass blocks through a respective one of the springs, and inner sides of the mass blocks are connected with a left end face of the magnet frame and a right end face of the magnet frame through the triboelectric modules respectively; and the triboelectric modules comprise a plurality of nano-friction power generation units which are connected in sequence; and
   adjacent two of the plurality of nano-friction power generation units are connected in a V-shape, each of the plurality of nano-friction power generation units is a substrate formed by polyimide, a non-conductive double-sided adhesive tape is pasted on the substrate, a copper sheet served as an electrode and configured for collecting charges is placed on the non-conductive double-sided adhesive tape, a wire is welded on the copper sheet to extract the charges, and a triboelectric material layer is pasted on the copper sheet through a conductive double-sided adhesive tape.

2. The electromagnetic and triboelectric hybrid energy collector for low-frequency movement according to claim 1, wherein the shell is a rectangular shell.

3. The electromagnetic and triboelectric hybrid energy collector for low-frequency movement according to claim 1, wherein a plurality of guide holes are formed in each of the top of the magnet frame and the bottom of the magnet frame, a guide ball is installed in each of the plurality of guide holes, a guide groove is formed in each of an inner side of the top cover and an inner side of the bottom cover, and a portion, which is protruding out of a corresponding one of the guide holes, of the guide ball is in rolling connection with the guide groove.

4. The electromagnetic and triboelectric hybrid energy collector for low-frequency movement according to claim 1, wherein insertion holes corresponding to the plurality of coils are formed in each of the coil frames, and each of the coil magnetic conductive columns is inserted into a corresponding one of the insertion holes and a corresponding one of through holes of the plurality of coils.

5. The electromagnetic and triboelectric hybrid energy collector for low-frequency movement according to claim 1, wherein a first limiting groove is formed in an inner side of each of the end caps and a second limiting groove is formed in an inner side, opposite to a corresponding one of the end caps, of each of the mass blocks, the first limiting groove and the second limiting groove each have a same diameter as a corresponding one of the springs, the first limiting groove and the second limiting groove each have a same depth as a wire diameter of the corresponding one of the springs, and two ends of each of the springs are arranged in the first limiting groove and the second limiting groove, respectively, and are fixed by a corresponding one of spring baffle plates.

6. The electromagnetic and triboelectric hybrid energy collector for low-frequency movement according to claim 1, wherein the triboelectric material layer comprises a nylon layer and a Teflon layer which are layered from top to bottom, a thickness of the nylon layer and a thickness of the Teflon layer are each 50 microns, and an effective area of the nylon layer and an effective area of the Teflon layer are each 120 mm$^2$.

7. The electromagnetic and triboelectric hybrid energy collector for low-frequency movement according to claim 1, wherein two of the end caps are installed at two ends of the shell through respective screws, and a gasket is further arranged between each of the two end caps and the shell.

8. The electromagnetic and triboelectric hybrid energy collector for low-frequency movement according to claim 1, wherein adjacent two of the plurality of nano-friction power generation units are connected in a V-shape.

9. The electromagnetic and triboelectric hybrid energy collector for low-frequency movement according to claim 1, wherein N poles and S poles of magnets forming the magnet array are alternately arranged.

10. The electromagnetic and triboelectric hybrid energy collector for low-frequency movement according to claim 9, wherein a distance between each array of the coil arrays and surfaces of the N poles and the S poles of the magnets is 0.5 mm.

* * * * *